United States Patent [19]

Kuckes

[11] Patent Number: 5,218,301
[45] Date of Patent: Jun. 8, 1993

[54] METHOD AND APPARATUS FOR DETERMINING DISTANCE FOR MAGNETIC AND ELECTRIC FIELD MEASUREMENTS

[75] Inventor: Arthur F. Kuckes, Ithaca, N.Y.

[73] Assignee: Vector Magnetics, Ithaca, N.Y.

[21] Appl. No.: 770,890

[22] Filed: Oct. 4, 1991

[51] Int. Cl.⁵ .................... G01V 3/20; G01V 3/26; G01B 7/14
[52] U.S. Cl. .................... 324/346; 324/207.26; 324/366; 324/368
[58] Field of Search ............ 324/338–347, 324/351–358, 366, 368, 369–372, 207.26, 226, 227, 207.14

[56] References Cited

U.S. PATENT DOCUMENTS

| | | | |
|---|---|---|---|
| 2,675,521 | 4/1954 | Geoffroy et al. | 324/370 X |
| 3,488,574 | 1/1970 | Tanguy | 324/372 X |
| 4,072,200 | 2/1978 | Morris et al. | |
| 4,323,848 | 4/1982 | Kuckes | 324/346 X |
| 4,372,398 | 2/1983 | Kuckes | 324/346 X |
| 4,396,075 | 8/1983 | Wood et al. | |
| 4,465,140 | 8/1984 | Hoehn, Jr. | |
| 4,502,010 | 2/1985 | Kuckes | 324/346 X |
| 4,529,939 | 7/1985 | Kuckes | |
| 4,593,770 | 6/1986 | Hoehn, Jr. | |
| 4,685,515 | 8/1987 | Huang et al. | |
| 4,700,142 | 10/1987 | Kuckes | 324/346 |
| 4,791,373 | 12/1988 | Kuckes | 324/346 |
| 4,845,434 | 7/1989 | Kuckes et al. | 324/346 |
| 4,933,640 | 6/1990 | Kuckes | 324/346 X |

OTHER PUBLICATIONS

"Use of New Ranging Tool to Position a Vertical Well Adjacent to a Horizontal Well" B. A. Tarr *Society of Petroleum Engineers* SPE 20446 pp. 421–430, Sep. 1990.

Primary Examiner—Gerard R. Strecker
Assistant Examiner—Warren S. Edmonds
Attorney, Agent, or Firm—Jones, Tullar & Cooper

[57] ABSTRACT

A method and apparatus for determining the distance from a relief borehole to a target well utilizes measurements of an electric field at the target well. The electric field is produced by injecting current into the earth near the wellhead of the target well, this current producing a target current in conductive material in the target well. The electric field corresponding to the target current is measured by means of sensors in the relief borehole, and this field measurement, together with a measurement of the alternating magnetic field at the relief well due to the target current, permits determination of the distance to the target well from the relief borehole.

7 Claims, 2 Drawing Sheets

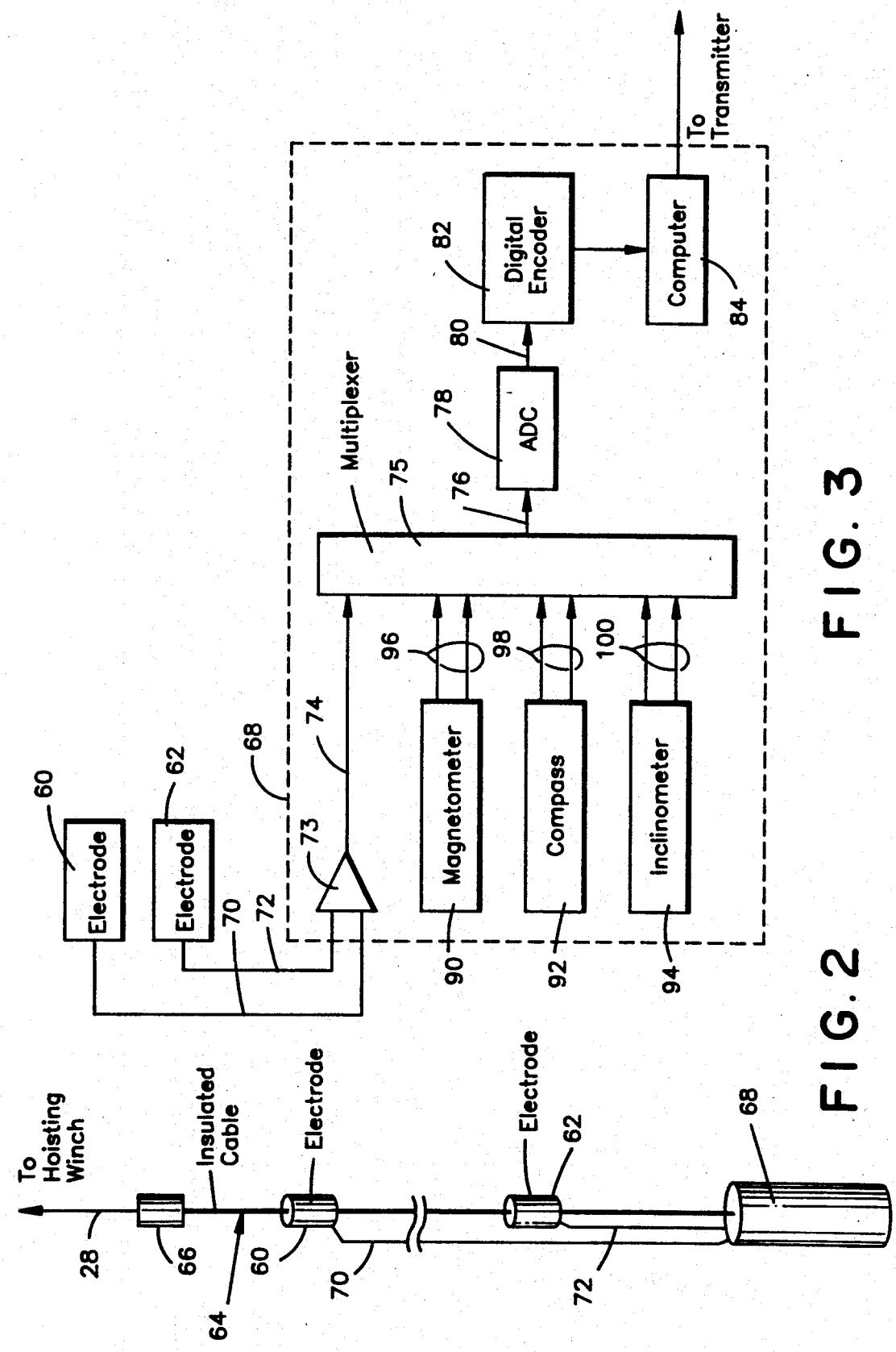

METHOD AND APPARATUS FOR DETERMINING DISTANCE FOR MAGNETIC AND ELECTRIC FIELD MEASUREMENTS

BACKGROUND OF THE INVENTION

The present invention relates to a method and apparatus for guiding the drilling of bore holes with respect to a target such as a blowout well, and more particularly to a system for determining the distance from a directional borehole to a target well bore by the measurement of electric fields.

The use of magnetic field measurements for determining the location of a cased target well bore is described in U.S. Pat. No. 4,372,398 which issued on Feb. 8, 1983 to the applicant herein, which patent is hereby incorporated herein by reference, in its entirety. In accordance with that patent, a low frequency alternating electric current flow is produced in the casing of the target well bore. During periodic interruptions in drilling of a directional, or relief, borehole, measurements are taken at selected depth intervals of the magnitude and direction of the magnetic field which is produced in the relief borehole by the current flow in the target well casing. At the same time, measurements are made of the magnitude and direction of the earth's magnetic field so that the orientation of the measurement device can be determined. From these measurements, the compass direction to the target well bore can be determined. By plotting changes in the amplitude and direction of the source of the magnetic field over the course of a number of measurements, and knowing the resistivity of the target well casing and thus the magnitude of the current flowing therein, estimates of the distance to the target well by triangulation can be made with good accuracy. A suitable magnetometer for use in making such magnetic field measurements is illustrated in U.S. Pat. No. 4,323,848, also issued to the present applicant, which patent is incorporated herein by reference, in its entirety.

U.S. Pat. No. 4,700,142, also issued to the applicant herein, discloses a method for locating a target well by means of a magnetic field produced by current flowing in the casing of such a well, but without the need to use the earth's magnetic field for orientation purposes. In this case, the orientation of the measuring device is fixed by various combinations of gyroscopes, accelerometers, magnetometer measurements, and bore hole survey data.

U.S. Pat. No. 4,933,640, issued Jun. 12, 1990 to the applicant herein also discloses a method and apparatus for determining the distance and direction of a target well from a directional borehole being drilled. In this case, a toroidal inductor surrounds a drill stem within the borehole being drilled, and this inductor acts as the source of ah AC current which is caused to flow in the target well bore to produce a secondary magnetic field which can be detected.

The determination of distance and direction by the measurement of magnetic fields in the manner disclosed in the foregoing patents has worked well for a number of years in guiding the drilling of directional wells to intersect (or to avoid) target well casings. However, there has been a long felt need for a more effective way to determine distance to a target in those circumstances when it is not possible to use magnetic field triangulation techniques. Such techniques require fitting the observed changes in the measurements of direction to the target versus depth, which information is obtained by means of well surveys conducted in accordance with the foregoing patents. A mathematical evaluation of the electromagnetic coupling between the current flowing in the target well and the excitation system is not required in this case. However, triangulation methods are not satisfactory when the relief well is on a "head on" drilling course directly toward a target well, and the determination of distance then involves intricate three-dimensional computations using the electrical resistivity of the earth in the region of the target well, the amount of steel or other electrically conductive material per foot in the casing or drill stem contained within the target well bore, as well as detailed survey information of the paths of both the target and the relief boreholes. Although such techniques have been reasonably successful, on occasion situations occur where the methods of computation available utilizing such magnetic field measurements also are unsuitable for carrying out accurate distance evaluations. For example, there are times when the weight of the steel in the target well is not known, or survey information is not available, or the electrical resistivity of the earth surrounding the target well and between the target and relief well is not known. Thus, there has arisen a need for an alternate method for determining the distance between a directional, or relief, borehole being drilled and a target well bore which is to be intersected (or avoided) by the directional borehole.

SUMMARY OF THE INVENTION

Briefly, the present invention provides a unique method and apparatus for determining the distance from a directional, or relief borehole to a target well bore utilizing measurements of the electric field produced by current-injecting electrodes of the type used to produce current flow in a target well bore in the above-discussed U.S. Pat. Nos. 4,372,398, 4,700,142, and 4,933,640. In each of these patents an alternating current is excited on the casing or other electrically conductive material within a target well bore either by the use of a surface electrode system having a current-injecting electrode near the target well head or by the use of a down-hole current-injecting electrode located within the relief well. In either case, one or more return electrodes are located on the earth's surface at locations some distance from the target well head. A surface electrode system typically injects about 10 amperes of alternating current at a frequency of a few Hertz or less into the casing within the target well.

In a preferred form of the invention, a surface electrode system is used, having a current-injecting electrode located adjacent the target well head. An electrical return is provided for the injecting electrode by means of a pair of return electrodes placed on opposite sides of the target well head at distances comparable to or greater than the depth at which the measurements are to be made. The current voltage supplied to the excitation electrodes produces an electric field in the formation which results in a current flow on the casing or other conductive material within the target well. At any point on the target well casing there is an electric field E to which the current flow on the target well is related by Ohms law. Thus, if the resistance per meter of the target casing or other conductive material in the target well is R, and the downward-directed component of the electric field in the target well is E volts per meter, the current flow in amperes on the target well is given simply by I=E/R. This current flow generates an electromagnetic field H in Amperes per meter at the location of a sensor such as a magnetometer in the relief well, with the sensor being a lateral distance d meters from the target well casing. The electromagnetic field at the sensor is approximated by Amperes law; that is, $$H = I/(2\pi d) \quad \text{(Equation 1)}$$

The electromagnetic field H can also be written as:

$$H = E_t/(2\pi dR) \quad \text{(Equation 2)}$$

Equation (1) and (2), rather than triangulation, can be used for determining the distance d in accordance with the present invention by evaluating the current I in the target well, or by determining the electric field Et in the target, if the resistance/meter R of the target is known, which is often the case. Often $E_t$ can be found by measurement of $E_f$, i.e. the electric field in the formations or by using $E_f$ measurements as part of an overall mathematical computation procedure.

The scale length λ i.e. the basic physical length unit relative to which other lengths should be measured is the length over which a significant change in the electric field $E_t$ occurs, and is given by:

$$\lambda = 1/\sqrt{2\pi\sigma R} \quad \text{(Equation 3)}$$

where σ is the conductivity of the earth in the vicinity of the depth of interest. This scale length for significant change in the electric field in the target is often greater than the distance d which is to be evaluated.

The measured alternating electric field $E_f$ in the earth formations near the sensing apparatus in the relief well is often representative of the electric field $E_t$ on the target well. Often, this electric field $E_f$ is directly related to the current I on the target well casing, in accordance with Ohms law. In this case, direct determination of the distance d to the target can be obtained using equations (1) and (2).

An extreme estimate of the error that might be made by equating the electric field measured in the earth formations to that on the target well is provided by assuming that the electric field in both the formations and the target is given by the field which would be present in the formation in the absence of the target well casing. In this case, an estimate of the difference δ between the electric fields with and without the target is:

$$\delta = 6\ln(\lambda/a)\frac{\lambda^2}{z^2} \quad \text{(Equation 4)}$$

where a is the radius of the target well casing and z the depth of measurement below a surface electrode at the target well head. For a representative case where the Earth conductivity is 0.2 (ohm-meters)$^{-1}$, the target well casing resistivity is 100 micro-ohms/meter, the radius a is 0.1 meter and the depth z is 1500 meters, a difference about 15% is indicated by equation (4). Even when this difference is larger, the measured electric field in the formations can often still be used to estimate the electric field in the target mathematically and to confirm overall mathematical modelling of target currents.

The electric field $E_f$ in the earth formations in the vicinity of sensing apparatus located within a directional relief borehole can be determined by measuring the voltage difference between two electrodes spaced an appropriate distance apart and carried by the cable, or wireline, supporting the measuring apparatus in that borehole. Such electrodes may be two 12 inch long iron tubes mounted, for example, 100 feet apart on an insulated cable and electrically connected to a voltage difference amplifier. The voltage between the electrodes may be 100 microvolts peak-to-peak, or more, in a typical measurement.

The alternating electromagnetic field H in the earth formation which results from current flow I in the target well due to the applied electric field $E_t$ can be measured with great accuracy by a suitable magnetometer. This magnetic field H together with the measured electric field voltage $E_f$ and the knowledge of the target well casing's resistance per meter R permits an accurate determination of the distance d between the sensor location and the target well location either without the need for complex computations of the type heretofore required, as discussed above, or if there is a significant margin of error indicated by equation 4, as a supplement to such computations.

BRIEF DESCRIPTION OF THE DRAWINGS

The foregoing, and additional objects, features and advantages of the present invention will become apparent to those of skill in the art from a consideration of the following detailed description of a preferred embodiment of the present invention, taken in conjunction with the accompanying drawings in which:

FIG. 2 is a diagrammatic illustration of the down hole sensing apparatus utilized in the present invention; and FIG. 3 is a block diagram of the circuitry in the sensor apparatus of FIG. 2.

DESCRIPTION OF PREFERRED EMBODIMENT

Figure 1:
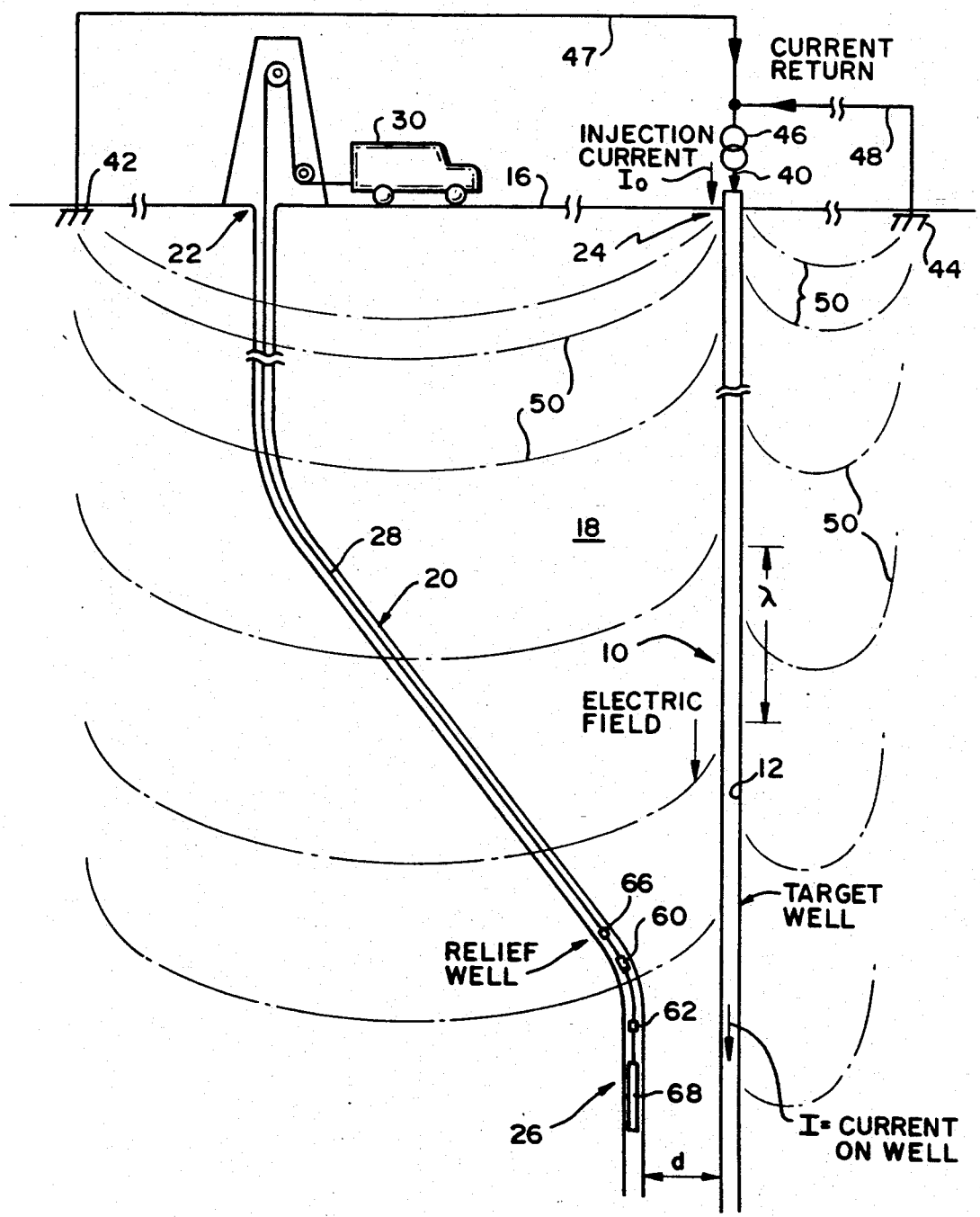
FIG. 1 is a diagrammatic illustration of the relationship between a target well and a directional relief well being drilled.

A preferred form of the target well locating system of the present invention is illustrated in FIG. 1 wherein a target bore 10 represents, for example, a gas well having a steel casing 12 which is to be located at some distance below the surface 16 of the earth 18. In some situations, the well 10 is to be intersected by a relief bore hole 20, while in other cases the relief bore hole will be drilled to avoid the target, as illustrated in FIG. 1. Bore hole 20 is drilled from a well head 22 which may be a half mile or more from the well head 24 of the target well 10. As described in the aforesaid U.S. Pat. No. 4,372,398 the relief bore hole is initially drilled utilizing conventional surveying techniques. However, as the relief bore hole approaches to within 150 or 200 feet of the target well, more accurate measurements are required to determine the distance between the wells and the direction from the relief bore hole to the target. Accordingly, during drilling of the relief bore hole 20, the drilling tool is periodically withdrawn and a sensor apparatus, generally indicated at 26, is lowered down bore hole 20 by means of a conventional well logging cable, or wire line 28 by means of conventional well logging equipment carried by vehicle 30 on the earth's surface near well head 22.

The sensing apparatus 26 incorporates a magnetic field sensor which may be a magnetometer of the type described in U.S. Pat. No. 4,323,848 and utilized in the magnetic field measuring system of U.S. Pat. No. 4,372,398. Such a magnetometer comprises, for example, two pairs of elongated U-shaped cores of laminated, high permeability metal, with adjacent portions of each pair being surrounded by a sensing coil. The sensing coils are arranged at right angles to each other in a horizontal plane, with the legs of the two cores in each pair extending vertically in opposite directions. Each coil produces an output signal proportional to one horizontal component of the magnetic field vector which is intersected by its corresponding pair of U-shaped laminated cores, and the two output signals are supplied by known techniques, as by way of suitable downhole processing circuitry, to a signal cable carried by the wire line. The wireline carries the signals to equipment in the logging vehicle 30 which records and processes them for use in determining the magnitude and direction of the detected magnetic field. The sensing apparatus 26 also preferably includes a conventional electronic compass which is sensitive to the earth's magnetic field and which thereby permits accurate orientation of the sensing apparatus so that the compass direction from the relief bore hole to the target well can be determined. The output signals from the compass are also supplied to the recording and processing equipment in vehicle 30.

In a preferred form of the invention, the sensing apparatus 26 incorporates an inclinometer which utilizes X axis and Y axis sensors to measure the vector components of the earth's gravitational field at the location of the sensor in the relief well. The outputs of the X axis and Y axis sensors provide a measure of the slope of the bore hole with respect to the vertical direction of the earth's gravitational field and of the rotational orientation of the instrument in the relief well, in the manner described in U.S. Pat. No. 4,933,640. These outputs are also supplied by way of suitable downhole processing circuitry to the recording and processing equipment in vehicle 30.

The magnetic field H to be sensed by the magnetometer in the sensing apparatus 26 is produced by current flow in the steel casing 12 or other electrically conductive material contained in the target well 10 as a result of current injected into the earth formations surrounding the wells. This current preferably is injected by means of a surface electrode system including an electrode 40 located at the well head 24 and preferably connected to the casing 12 or other conductive material in the target well 10. If the surface electrode 40 cannot be connected directly to the casing at the well head, as when the top of the casing is not accessible, it should be placed as near as possible to the well head in order to inject current into the earth in the region of well head 24. Second and third surface return electrodes 42 and 44 are placed symmetrically on either side of the well 10, preferably spaced a distance equal to or greater than the depth at which the measurements of distance are to be made. Thus, the electrodes 42 and 44 may be spaced from the electrode 40 by distances of one or two miles, or more. A source 46 of alternating current is connected between electrode 40 and electrodes 42 and 44, with ground cables 47 and 48 providing the necessary connections to the electrodes for the return current to the AC source 46.

As described in the aforesaid U.S. Pat. No. 4,732,398, the application of current between injection electrode 40 and return electrodes 42, 44 produces ground currents indicated by lines 50 in the earth formations 18. The ground currents travel through the earth and are concentrated in the steel casing 12, with the current I in the casing producing a magnetic field H having a horizontal component which can be detected by the sensor apparatus 26 in the relief well 22. Although the magnitude of the current in the casing 12 is quite small at depths on the order of 10,000 feet below the earth's surface, the resulting magnetic fields can be measured by an extremely sensitive magnetic flux sensor at the sensor apparatus 26 at distances of 200 feet or more.

The generator 46 injects a current on the order of 10 amperes at a frequency of between about 0.25 Hertz and about 10 Hertz to produce an alternating magnetic field which can be detected and distinguished from the earth's magnetic field.

In accordance with the present invention, the sensing apparatus 26, in addition to the magnetometer, inclinometer, and compass discussed above, includes a pair of spaced sensing electrodes 60 and 62 mounted on the wireline 28 by means of an electrically insulating cable 64 (FIG. 2). The cable 64 is secured to the wireline by means of a connector 66 and carries a sensor tool 68 at its distal end. The electrodes 60 and 62 preferably are iron (or steel) sleeves surrounding cable 64 and preferably are spaced apart by a distance of about 100 feet. The electrodes are connected by means of lines 70 and 72, respectively, to the sensor tool 68 connected at the bottom of cable 64, which tool contains the magnetometer, inclinometer and compass discussed above, as well as suitable processing electronics to be described.

The voltage supplied to the well head 24 by means of AC source 46 produces an electric field E in the earth 18 which has a voltage gradient from the surface downwardly, in the direction of the current I. This electric field may also be represented by the lines 50 with the potential gradient between adjacent field lines being related to the current flow in the target well 10 and to the resistance per meter of the target casing 12 by Ohms law $I = E/R$.

The electric field produced by the current supplied to electrode 40 remains generally constant in horizontal planes surrounding the target well, although the field will gradually diminish with distance toward the target well 10. The scale length $\lambda$ for significant changes in the field $E_t$ along the target well 10 is given by equation 3, and as long as the value is much greater than the distance d which is to be evaluated, the measured alternating electric field $E_f$ in the vicinity of the magnetic sensing apparatus 26 will be representative of the target well field in a common horizontal plane, and thus the value $E_f$ can be used in the calculation of the distance d with good accuracy.

The electrodes 60 and 62 detect the electric field values at two spaced locations in the relief well, and the voltages so detected are supplied by way of lines 70 and 72 to a voltage difference amplifier 73 (FIG. 3) located in the sensor unit 68. The output from the amplifier 70 represents the difference between the voltage detected at the location of electrode 60 and the voltage detected at the location of electrode 62 and thus is a measure of the voltage gradient, or electric field $E_f$ at the relief well 20. This voltage gradient value is supplied by way of line 74 to one input of a multiplexer 75, the output of which is supplied by way of line 76 to an analog to digital converter (ADC) 78. The output of the ADC on line 80 digitally represents the voltage on line 74 when that line is selected by the multiplexer. The signal on line 80 is supplied to a digital encoder 82 which produces output signals which are supplied to a computer 84 which may be located in the truck 30, but which preferably is located in the down hole sensor unit 68, as illustrated in FIG. 3. The signals from the computer 84 (or from the encoder 82 when the computer is at the surface) are directed to the surface by way of a suitable transmitter (not shown) in conventional manner.

The outputs from the AC field magnetometer 90, which measures the field H, the compass 92 which measures the earth's magnetic field, and the inclinometer, or gravity sensor 94, are also supplied to the multiplexer 74 by way of corresponding output lines 96, 98 and 100, respectively. The multiplexer sequentially selects these outputs in known manner and transmits them through the analog to digital converter 78 and the encoder 82, again in conventional manner, for transmission to computer 84 either in the unit 68 or at the earth's surface.

The measurement of the electric field $E_f$ together with the measurements of the electromagnetic field H at the location of the sensor 26 permits not only a calculation of the direction from the relief well 20 to the target well 10 in the manner described in the '398 patent discussed above, but also permits an accurate evaluation of the distance between the relief and target wells in accordance with the formulas set forth hereinabove, thereby providing a more accurate and reliable control of the drilling of the relief well.

Although the present invention is described in terms of a preferred embodiment thereof, it will be apparent that numerous modifications and variations may be made without departing from the true spirit and scope thereof. Thus, for example, the current flow in the target well 10 may be generated by means of injection electrodes carried by the wire line 28, in the manner illustrated in the '398 patent instead of utilizing the surface electrodes 40, 42 and 44 illustrated in FIG. 1. However, the principle of operation of the present invention remains the same to permit the distance between the relief well and the target well to be determined by measuring the electric field gradient. Thus, the scope of the present invention is limited only by the following claims.

What is claimed is:

1. Apparatus for evaluating the distance between a bore hole in the earth and an electrically conductive target in the earth, comprising:
   a target in the earth and including electrically conductive means;
   first and second current supply electrodes in contact with the earth in the region of said target;
   means supplying an alternating current of low frequency between said first and second current supply electrodes to produce an alternating electric potential field in the earth surrounding said target and to produce an electric field along said electrically conductive means in said target to produce an alternating target current;
   a bore hole having a longitudinal, generally vertical axis;
   magnetic field sensor tool means movably supported by a wireline in said bore hole and responsive to an alternating electromagnetic field produced in the earth surrounding said target by said target current to produce magnetic field sensor output signals;
   electric field sensor means comprising first and second spaced sensor electrodes movably supported in said bore hole by said wireline and spaced from each other along the longitudinal axis of said bore hole and spaced from said magnetic field sensor tool means, said sensor electrodes being responsive to the electric potential field produced in the earth in the region of said bore hole by said alternating current to produce first and second electric potential field output signals;
   differential amplifier means in said tool means connected to said first and second sensor electrodes and responsive to said first and second electric potential field output signals to produce an electric field sensor signal representing the electric potential field gradient in the earth surrounding said bore hole between said sensor electrodes; and
   means responsive to said magnetic field sensor output signals and to said electric field sensor signal for evaluating said target current to thereby determine the horizontal distance between said electric field sensor means in said bore hole and said target.

2. The apparatus of claim 1, wherein said electrically conductive means has a known electrical resistance, whereby said target current is determinable to permit direct measurement of the horizontal distance between said target and said electric field sensor means.

3. The apparatus of claim 1, wherein said first current supply electrode comprises electrode means electrically connected to said conductive means at said target.

4. The apparatus of claim 3, wherein said target is a well having a surface wellhead and containing said electrically conductive means and wherein said second current supply electrode is a return electrode and comprises electrode means in contact with the earth's surface and spaced from the wellhead of said target well.

5. The apparatus of claim 4, wherein said electric field sensor means is located in said bore hole at a selected distance below the earth's surface and wherein said return electrode is spaced from said wellhead by a distance approximating said selected distance.

6. Apparatus for evaluating the distance between a bore hole in the earth and an electrically conductive target in the earth, comprising:
   a target in the earth including electrically conductive means;
   at least a first current supply electrode in contact with the surface of the earth in the region of said target, said first supply electrode being spaced from said target by a distance substantially equal to a selected target depth;
   at least a second current supply electrode electrically contacting said target; p1 means supplying an alternating potential of low frequency between said first and second supply electrodes to produce a generally vertical alternating electric field in the earth surrounding said target and along said conductive means to thereby produce an alternating target current therein;
   a bore hole spaced from said target and having a longitudinal, generally vertical axis;
   a magnetic field sensor tool movably supported in said bore hole by a wireline at about said selected depth, said tool incorporating magnetic field sensor means responsive to electromagnetic fields in the earth surrounding said bore hole and caused by said target current to produce magnetic field sensor output signals;
   electric field sensor means comprising first and second sensor electrodes supported in said bore hole at about said selected depth by said wireline, at least one of said sensor electrodes being spaced from said tool, said electrodes being spaced apart vertically along the longitudinal axis of said bore hole, said sensor electrodes being responsive to the alternating potential field caused by said alternating target current to produce a corresponding electric field output signal; and means responsive to said magnetic field sensor output signals and to said electric field output signal to produce a value representing the horizontal distance between said target and said bore hole at said selected depth.

7. A method of determining the horizontal distance between a target well containing electrically conductive material and a second well, comprising:

positioning first and second current supply electrodes at the surface of the earth in the region of the target well and of the second well, the first supply electrode being at the wellhead of the target well and the second supply electrode being spaced therefrom at a distance which is approximately equal to the selected depth in the second well at which an electric potential field gradient is to be measured;

supplying an alternating potential of low frequency across said current supply electrodes to produce ground currents in the earth formations surrounding said target well and said second well and in the electrically conductive material in the target well to produce an alternating target current I and a corresponding electric field E along the axis of the conductive material in the target well, the electric field E and the target current I having the relationship $E = IR$, where R is the resistance per unit length of the conductive material, measuring the alternating electric potential field gradient due to said target current in the region of said second well by means of a pair of electric field sensors located in, and spaced apart along the axis of, the second well, and located at said selected depth thereof;

measuring by means of magnetic field sensors located in said second well at a position spaced apart from said electric field sensor's the alternating magnetic field in the region of said second well produced by said target current;

determining, from said measured magnetic field and from said measured electric field and from said measured electric potential field gradient the horizontal distance between said target well and said second well at said selected depth of said electric field sensors.

* * * * *

UNITED STATES PATENT AND TRADEMARK OFFICE
CERTIFICATE OF CORRECTION

PATENT NO. : 5,218,301

DATED : June 8, 1993

INVENTOR(S) : KUCKES, Arthur F.

It is certified that error appears in the above-identified patent and that said Letters Patent is hereby corrected as shown below:

Column 8, line 50, cancel "p1".

Column 10, line 10, change "int he" to --in the--;

Column 10, line 15, after "measuring" insert a comma (--,--);

Column 10, line 17, change "sensor's" to --sensors,--.

Signed and Sealed this

Eighteenth Day of January, 1994

Attest:

BRUCE LEHMAN

*Attesting Officer*     *Commissioner of Patents and Trademarks*